United States Patent Office 3,167,549
Patented Jan. 26, 1965

3,167,549
DERIVATIVES OF 7-AMINOCEPHALOSPORANIC ACID
John R. E. Hoover, Glenside, Pa., assignor to Smith Kline & French Laboratories, Philadelphia, Pa., a corporation of Pennsylvania
No Drawing. Filed May 18, 1961, Ser. No. 110,869
9 Claims. (Cl. 260—243)

This invention relates to novel organic compounds possessing valuable chemotherapeutic activity and more specifically to antimicrobial activity.

Heretofore, a major difficulty encountered in antimicrobial therapy has been the susceptibility of the particular compound to enzymatic degradation within the infected animal's body. Thus penicillin G, while effective against a great number of micro-organisms, shows little effect in tolerable doses against certain other micro-organisms, notably the so called "penicillin resistant" strains of Staphylococci. To date, efforts to overcome this difficulty by substituting other side chains in place of benzylcarboxy side chains of penicillin G have met with only limited success, for those synthetic penicillins which do demonstrate activity against the penicillin resistant Staph., generally also exhibit a poorer profile of other important properties, such as for example, a low absorption when administered via the oral route.

A different approach to the problem of "penicillin resistant" Staph. has now found an answer in the use of other antibiotic nuclei, notably 7-aminocephalosporanic acid and certain related heterocyclic compounds which are the subjects of copending applications. These nuclei apparently possess an inherent resistance to penicillinase and their derivatives wherein the side chain corresponds to the side chain of a susceptible penicillin, as for example benzylcarboxy, are not appreciably affected by penicillinase.

I have discovered a novel class of compounds which not only demonstrates resistance to penicillinase but exhibits advantageous physiological properties and antimicrobial activity against a wide variety of micro-organisms. In particular, the compounds of this invention demonstrate superior plasma and organ levels upon administration to animal organisms. These properties are apparently due to improved absorption and/or greater resistance to degradation within the host animal's body.

The compounds of this invention may be represented by the following structural formula:

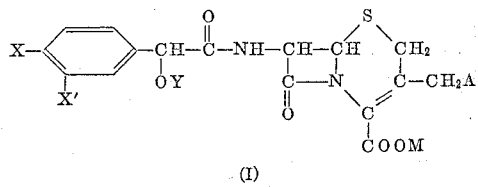

(I)

wherein A is hydrogen, lower alkanoyloxy, benzoyloxy, hydroxy, pyridinium or when taken together with M, a monovalent carbon-oxygen bond; M is hydrogen, pharmaceutically acceptable cations, an anionic charge or when taken together with A, a monovalent carboxy-oxygen bond; X' is hydrogen, halogen, lower alkyl, lower alkoxy, nitro or trifluoromethyl and Y is hydrogen or methyl. More specifically A is selected from the group consisting of hydrogen, lower alkanoyloxy, benzoyloxy, hydroxyl, pyridium, and a carbon-oxygen bond to the carboxylic acid radical. In those instances where A is pyridinium, the cationic charge on this group is matched by the anionic charge of the carboxylic acid radical, the entire molecule being of a Zwitterionic nature and M thus comprising an anionic charge. The symbol A also embraces hydroxyl or the lower alkanoic acid esters and the benzoic acid esters thereof. This hydroxyl group embraced by A may furthermore be esterified internally by the carboxylic acid radical of the heterocyclic nucleus, thereby forming a lactone ring as represented when A and M taken together comprise a monovalent carboxy-oxygen bond.

Also embraced within the scope of the present invention are the non-toxic pharmaceutically acceptable salts of the above carboxylic acid radical. The cations comprised in these salts and embraced by M include for example, the alkali metal ions, as for instance the sodium ion, potassium ion, calcium ion as well as the ammonium radical and the organic amine cations, such as the lower alkyl ammonium groups, as for instance triethylammonium, and the other common pharmaceutically acceptable amine cations such as those of N-ethylpiperidine, procaine and the like.

The group Y includes hydrogen and methyl.

The groups X and X' are selected from the group consisting of hydrogen, halogen such as chloro, bromo, iodo, and fluoro, lower alkyl, lower alkoxy, nitro, and trifluoromethyl. The groups X and X' may be but are not necessarily the same.

By the terms lower alkyl, lower alkanoyloxy and lower alkoxy when employed in regard to this invention, is intended a group embracing a branched or straight chained hydrocarbon group containing from one to six carbon atoms.

The compounds of my invention wherein Y is methyl are prepared by treating a compound of the structure

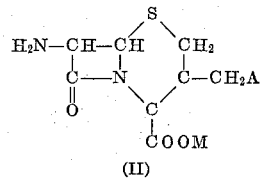

(II)

with the appropriately substituted phenylacetyl chloride or the mixed anhydride obtained from the particular phenylacetic acid and a lower alkyl chloroformate and isolating the product thereby formed. In general, this reaction may be represented as follows:

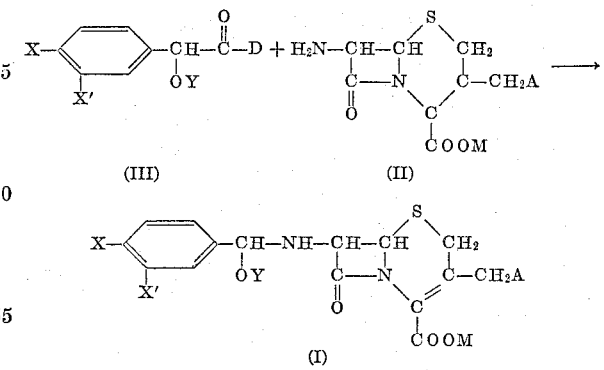

(I)

wherein D represents halogeno or

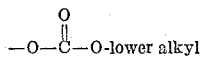

when Y represents methyl.

In those instances wherein Y represents hydrogen, I have found it advantageous to employ a cyclic carboxyanhydride of the appropriate mandelic acid. While the mixed anhydride or acid chloride may alternatively be employed, higher yields are generally obtained with a higher degree of purity of the final product when the cyclic carboxyanhydride is employed. This reagent, prepared by treating the appropriate mandelic acid with phosgene, is utilized to treat the desired cephalosporanic acid compound to yield the final product in the following manner:

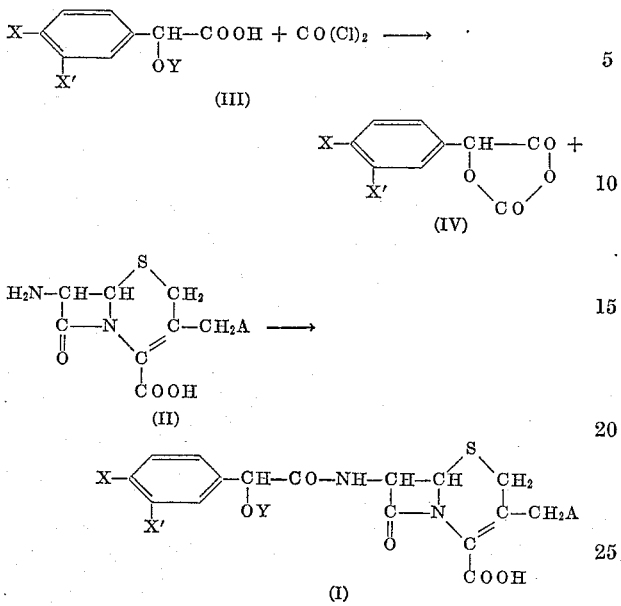

where Y represents hydrogen.

The starting materials whose structures are represented by Formula II include for example, 7-aminocephalosporanic acid and certain related derivatives of 7-aminocephalosporanic acid. This heterocyclic compound, 7-aminocephalosporanic acid can be prepared from the antibiotic substance Cephalosporin C whose physical and antimicrobial properties are known to the art and whose structure is represented by the structural formula:

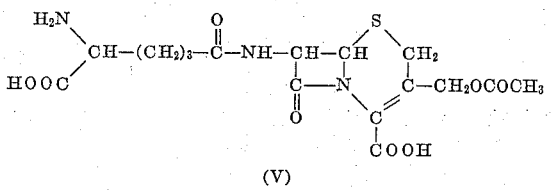

Upon hydrolysis is Cephalosporin C, as for example acid hydrolysis, there is formed α-aminoadipic acid and 7-aminocephalosporanic acid whose structure may be represented by the formula:

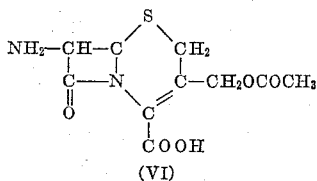

In addition to the formation of 7-aminocephalosporanic acid upon hydrolysis of Cephalosporin C, there is also further formed by hydrolysis of the acetyloxy grouping and subsequent internal esterification, the lactone having the formula:

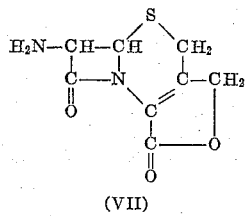

These two products designated by Formula VI and Formula VII described in Belgium Patent #593,777 are readily separated by virtue of the different physical properties, as for example, by chromatographic techniques.

It has been further found possible to modify the structure of 7-aminocephalosporanic acid by enzymatic cleavage of the acetyloxy grouping without subsequent lactone formations. There is thus formed the compound 3-hydroxymethyl-7-aminodecephalosporanic acid represented by the formula:

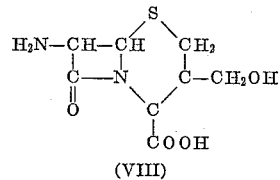

The designation decephalosporanic acid is herein employed for purposes of nomenclature only and intended to represent the basic heterocyclic acid nucleus having the formula:

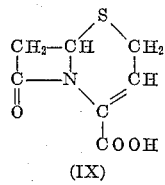

This cleavage of the acetyloxy grouping to form 3-hydroxymethyl-7-aminodecephalosporanic acid without subsequent lactone formations may be accomplished by employing enzymatic means, as for example, by the action of an acetylesterase. Such suitable enzyme preparations may be obtained for example, from citrus fruits such as oranges, grapefruit, lemons and the like, as described by Jansen et al., Arch. Biochem., 15, 415 (1957). Preparations of such an enzyme advantageously effect hydrolysis of the acetyloxy side chain without subsequent lactone formation. The resultant hydroxy group may then be further modified as by re-esterification with a lower alkanoic acid radical or a benzoic acid radical so as to form the lower alkanoate esters homologous to the acetate ester present in the naturally occurring Cephalosporin C or the corresponding benzoate ester.

As the conditions and reagents employed in acylating hydroxyl groups are similar to those for acylating amino groups, it is generally desirable in practice to effect acylation of the hydroxymethyl group in the 3-position of decephalosporanic acid, after formation of the carboxyamido group in the 7-position. Deacetylation on either Cephalosporin C or 7-amino-cephalosporanic acid according to the enzymatic techniques discussed herein followed by reacylation of the resultant hydroxyl group generally results in concurrent acylation of the amino group in the 7-position of 7-aminocephalosporanic acid respectively. Thus in practice, Cephalosporin C is cleaved by acid hydroylsis as herein described to yield 7-aminocephalosporanic acid which in turn is subjected to the procedure of this invention to obtain the 7-carboxyamido derivative of cephalosporanic acid. This compound may then be treated with acetylesterase as herein described to yield the corresponding compound containing a hydroxymethyl group in the 3-position which in turn is reacylated by methods analogous to those known to the art, such as for example, by means of an acyl halide or acid anhydride.

Treatment of Cephalosporin C with a tertiary base such as for example, pyridine, quinoline, or collidine prior to acidic hydrolytic cleavage of the aminoadipic acid side chain forms a quaternary salt derivative of Cephalosporin C which when hydrolyzed yields a nucleus which, in the case of pyridine, has been assigned the name, 3-pyridiniummethyl-7-aminodecephalosproanic acid inner salt and the structure:

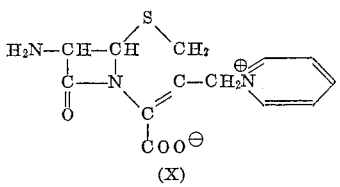

(X)

Reduction of Cephalosporin C with, for example palladium-on-carbon, followed by hydrolysis or reduction of 7-aminocephalosporanic acid yields a nucleus wherein A is hydrogen. This compound has been assigned the name 3-methyl-7-aminodecephalosporanic acid and the structure:

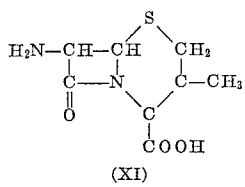

(XI)

The procedure leading to the compound XI, the compound XI itself and the novel intermediates obtained thereby are specifically disclaimed from the present invention.

Several of the requisite substituted phenylacetic acids employed as starting materials are readily available. Those which are not can be prepared by methods analogous to those known in the art.

The preferred compounds of my invention are those of Formula I wherein X and X' represent chloro, Y represents methyl, A represents hydrogen, lower alkanoyloxy or benzoyloxy, and M represents hydrogen or a pharmaceutically acceptable cation.

The following examples will serve to further typify the nature of this invention; however these examples should not be construed as restricting the scope of this invention, the scope being defined only by the appended claims.

Example 1

To 53.0 g. (1.33 moles) of sodium hydroxide in 175 ml. of water is added 23.4 g. (0.1 mole) of 3,4-dichloromandelic acid. The mixture is cooled to 45–50° and 69.4 g. (0.55 mole) of dimethylsulfate is added over a period of 2½ hours. At the end of this time the solid is collected by filtration and dissolved in water. This solution is then adjusted to pH 3.1 by the addition of concentrated hydrochloric acid and the solid which thus forms is collected by filtration and recrystallized from water to yield the sodium salt of α-methoxy-3,4-dichlorophenylacetic acid.

This salt is dissolved in hot water and treated with concentrated sulfuric acid, employing approximately 42 ml. of acid per mole of compound. This solution is extracted with ether and the ethereal extracts washed with water, dried over magnesium sulfate and distilled to remove the solvents. The residue so obtained is recrystallized from petroleum ether to yield α-methoxy-3,4-dichlorophenylacetic acid.

In a similar fashion other substituted mandelic acids are subjected to this procedure to obtain the correspondingly substituted α-methoxyphenylacetic acid derivatives. Thus the following are subjected to the above procedure: 4-bromomandelic acid, 4-chloromandelic acid, 4-iodomandelic acid, 3-fluoromandelic acid, 4-nitromandelic acid, 4-methylmandelic acid, 4-isopropylmandelic acid, 3,4,-dimethoxymandelic acid, 4-methoxymandelic acid and 4-trifluoromethylmandelic acid.

There are accordingly obtained upon execution of the described procedure the following compounds: α-methoxy-4-bromophenylacetic acid, α-methoxy-4-chlorophenylacetic acid, α-methoxy-4-iodophenylacetic acid, α-methoxy-3-fluorophenylacetic acid, α-methoxy - 4 - nitrophenylacetic acid, α-methoxy-4-methylphenylacetic acid, α-methoxy-4-isopropylphenylacetic acid, α-methoxy - 3,4 - dimethoxyphenylacetic acid, α-methoxy-4-methoxyphenylacetic acid and α-methoxy-4-trifluoromethylphenylacetic acid.

Example 2

Four grams of Cephalosporin C as the sodium salt are dissolved in 60 ml. of water and the pH adjusted to 2.5 by the addition of the acid form of Dowex 50 (x8). The resin is filtered and washed with 20 ml. of water and to the combined filtrate and washings are added 20.5 ml. of 0.1 N hydrochloric acid. The mixture is allowed to stand for 72 hours at 20° C. and at the end of this time introduced onto a column of Dowex-1 (as the acetate form), 2 cm. x 10 cm. The initial percolate is collected in 10 ml. fractions and upon the collection of the twelfth fraction the column is eluted with water until a total of 34 fractions have been collected. The column is thereupon eluted with 0.5 N acetic acid and an additional 65 fractions collected.

Fractions of 36 through 45 are combined and concentrated by freeze drying to yield 7-aminocephalosporanic acid.

Fractions 2 through 16 are combined and concentrated in vacuo to yield the lactone of desacetyl Cephalosporin C which when resubjected to the above acid hydrolysis procedure yields 3 - hydroxymethyl - 7 - aminodecephalosporanic acid lactone.

By increasing the concentration of the acid in the above procedure from 0.1 N to 1.0 N and the length of reaction to four days the amounts of desacetyl Cephalosporin C lactone and 3 - hydroxymethyl - 7 - aminocephalosporanic acid lactone are increased.

Alternatively 7-aminocephalosporanic acid and 3-hydroxymethyl-7-aminodecephalosporanic acid lactone are prepared according to the procedures described in Belgian Patent #593,777.

Example 3

A. One gram of Cephalosporin C as the sodium salt is dissolved in 50 ml. of water. There is then added sufficient Dowex 50 (x8) resin as the hydrogen form to adjust the pH to 2.6. The resin is removed by filtration and to the filtrate is added 3.8 ml. of pyridine, the pH rising to approximately 6.5. The solution is maintained in a glass container at 37° C. for 48 hours. At the end of this time the solution is freezed dried and the residue triturated twice with 50 ml. of acetone and redried. The solid is then dissolved in 10 ml. of water and introduced onto a Dowex 1 (x10) acetate column (2 cm. x 10 cm.). The column is eluted with water and 10 ml. fractions are collected. Fractions 2 through 4 are then combined and freezed dried, and the residue stirred with acetone and dried to yield the pyridinium inner salt of desacetyl Cephalosporin C.

B. This material is then subjected to the acidic hydrolytic procedure as described in Example 2. Upon chromatographic separation as described therein, the earlier fractions collected are combined and reduced to a residue to yield 3-pyridiniummethyl-7-aminodecephalosporanic acid inner salt. The latter fractions are combined and concentrated to a residue to yield the pyridinium inner salt of desacetyl Cephalosporin C which may be resubjected to the hydrolytic procedure to yield additional material.

Example 4

A. Cephalosporin C sodium salt dihydrate (.75 g.) in sufficient water to effect dissolution is added to an aqueous suspension of 2.0 g. of 10% palladium on carbon in 30 ml. of water which has been previously saturated with hydrogen. The mixture is hydrogenated with agitation at one atmosphere pressure for 1 hour.

The catalyst is removed by centrifugation and the supernatant is preserved. The catalyst is then extracted with 80% aqueous methanol at pH 8, and these extracts then adjusted to pH 6 by the addition of hydrochloric acid. The extract is evaporated to a small volume and added to the original reaction solution. The combined solution is then brought to pH 6 with sodium hydroxide and lyophilized to yield 3-methyl-7-(ω-aminoadipoylamido)-decephalosporanic acid as the sodium salt.

B. The product obtained in Part A of this example (.3 g.) is dissolved in 7 ml. of water containing .25 g. of anhydrous sodium bicarbonate. To this stirred solution is added .25 g. of 1-fluoro-2,4-dinitrobenzene in 7 ml. of ethyl alcohol. The mixture is stirred in the dark at room temperature for 2½ hours. The pH of the solution is then adjusted to 5 by the addition of concentrated hydrochloric acid and the alcohol is removed under reduced pressure.

The mixture is adjusted to pH 7 by the addition of sodium bicarbonate and extracted with ether to remove excess 1-fluoro-2,4-dinitrobenzene, yielding a clear aqueous solution. The pH is adjusted to 2.5 by the addition of concentrated hydrochloric acid and extracted several times with ethyl acetate. These ethyl acetate extracts are washed with water, dried over anhydrous sodium sulfate and evaporated to yield 3-methyl-7-[ω-2,4-dinitrophenylamine-adipoylamido]-decephalosporanic acid.

C. The solid obtained in Part B of this example (1 g.) is dissolved in 10 ml. of acetonitrile and 10 ml. of N-hydrochloric acid. This solution is stored in the dark at 37° C. under nitrogen for 64 hours.

At the end of this time, 20 ml. of water are added to this solution and the solution then extracted five times with 10 ml. portions of ethyl acetate. The residual solution is then brought to pH 6 with N-sodium hydroxide, and added to a column of Dowex-1 (x8) (acetate form, 3 cm. x 5 cm.). When all of the solution has been introduced onto the column, the column is washed with 60 ml. of water and then the product eluted with 2 N acetic acid. Lyophilization of the acetic acid eluate yields the product, 3-methyl-7-aminodecephalosporanic acid as a solid.

*Example 5*

The acid chlorides employed in this invention are prepared according to the following procedure, typified by the preparation of α-methoxy-3,4-dichlorophenylacetyl chloride.

A solution of 8.29 g. (0.035 mole) of α-methoxy-3,4-dichlorophenylacetic acid and 25 ml. thionyl chloride is allowed to stand at room temperature for 10 hours. The excess thionyl chloride is removed under reduced pressure and the resultant solid collected under reduced pressure and washed with cold heptane to yield α-methoxy-3,4-dichlorophenylacetic acid.

α-Methoxy-3,4-dichlorophenylacetyl chloride (8.81 g., 0.035 mole) in 35 ml. of acetone is added with stirring to a solution of 4.08 g. (0.015 mole) of 7-aminocephalosporanic acid in 200 ml. of 3% aqueous sodium bicarbonate solution and 120 ml. of acetone. The mixture is stirred for one-half hour and then extracted with three portions of 150 ml. of ether. The residual aqueous phase is cooled to 5° C. and adjusted to pH 2.5 by the addition of dilute hydrochloric acid. The solution is then extracted three times with butyl acetate. These extracts are washed with water and then 40 ml. of water are added and the pH adjusted to 8.0 by the addition with agitation of solid potassium bicarbonate. The aqueous layer is separated, filtered and adjusted to pH 2.0 by the addition of concentrated sulfuric acid at a temperature below 10°. The resultant acidic aqueous mixture is extracted twice with butyl acetate and these extracts are washed with water and dried over sodium sulfate. The dried solution is added with vigorous stirring to a solution of potassium hydroxide in n-butanol (40 g./l.) until the pH is 8.4. The mixture is cooled until crystallization occurs and the crystals so formed are collected by centrifugation, washed with a small amount of acetone and dried. The dried crystals are dissolved in a minimum quantity of acetone:water (9:1) and precipitated by the addition of anhydrous acetate. These crystals are collected and dried to yield 7-(α-methoxy - 3,4 - dichlorophenylacetamido) - cephalosporanic acid as the potassium salt. Treatment of an aqueous solution of this potassium salt with hydrogen chloride and extraction with ether then yields the free acid 7 - (α - methoxy - 3,4 - dichlorophenylacetamido) - cephalosporanic acid.

Similarly by employing an equivalent quantity of α-methoxyphenylacetic acid in this procedure, there is obtanied the compound 7-(α-methoxyphenylacetamido)-cephalosporanic acid.

*Example 6*

α-Methoxy-4-bromophenylacetic acid, α-methoxy-4-trifluoromethylphenylacetic acid, and α-methoxy-4-methoxyphenylacetic acid are employed in equivalent amounts in place of α-methoxy-3,4-dichlorophenylacetic acid in the procedure of Example 5. Upon completion of the steps therein described there are respectively obtained the compounds, 7-(α-methoxy-4-bromophenylacetamido)-cephalosporanic acid, 7-(α-methoxy-4-trifluoromethylphenylacetamido)-cephalosporanic acid and 7-(α-methoxy-4-methoxyphenylacetamido)-cephalosporanic acid.

*Example 7*

To 4.3 g. of 3-methyl-7-aminodecephalosporanic acid in 190 ml. of 3% aqueous bicarbonate solution and 120 ml. of acetone is added 7.39 g. of α-methoxy-4-chlorophenylacetyl chloride. The reaction mixture is maintained at 25° C. for 1½ hours and then extracted twice with 150 ml. of ether. To the residual aqueous solution is added 40 ml. of butyl acetate, the mixture cooled below 10° and the pH adjusted to 2.4 with 20% phosphoric acid. The phases are separated and the aqueous phase extracted with 15 ml. of butyl acetate. The combined butyl acetate solutions are washed with 10 ml. of water and the washed organic solution next dried over magnesium sulfate and filtered. To the filtrate is added 9.6 ml. of 30% potassium 2-ethylhexanoate in isopropanol. One volume of ether is then added with stirring and the solid which forms upon cooling is collected by filtration, washed with 1:1 ether-butyl acetate, then ether and finally dried to yield 3-methyl-7-(α-methoxy-4-chlorophenylacetamido)-decephalosporanic acid as the potassium salt.

Treatment of an aqueous solution of this potassium salt and hydrogen chloride and extracts with ether then yields the free acid 3-methyl-7-(α-methoxy-4-chlorophenylacetamido)-decephalosporanic acid.

By employing other substituted α-methoxyphenylacetic acid compounds described herein in place of α-methoxy-4-chlorophenylacetyl chloride in this example, the corresponding methoxy compounds are obtained. Thus are employed α-methoxyphenylacetic acid, α-methoxy-3,4-dichlorophenylacetic acid, α-methoxy-4-trifluoromethylphenylacetic acid, α-methoxy-4-nitrophenylacetic acid and α-methoxy-4-isopropylphenylacetic acid to obtain respectively the compounds 3-methyl - 7 - (α - methoxyphenylacetamido) - decephalosporanic acid, 3-methyl-7-(α - methoxy - 3,4 - dichlorophenylacetamido) - decephalosporanic acid, 3 - methyl - 7 - (α - methoxy - 4 - trifluoromethylphenylacetamido) - decephalosporanic acid, 3 - methyl - 7 (α - methoxy - 4 - nitrophenylacetamido)-decephalosporanic acid, and 3-methyl-7-(α-methoxy-4-isopropylphenylacetamido)-decephalosporanic acid.

*Example 8*

3-hydroxymethyl-7-aminodecephalosporanic acid lactone (3.18 g.) is substituted for 7-aminocephalosporanic acid and is allowed to react with α-methoxy-3,4-dichlorophenylacetyl chloride as described in Example 5. The reaction mixture is extracted three times with butyl acetate and the combined extracts washed with water and dried over sodium sulfate. The dried butyl acetate extracts are then concentrated to a residue comprising 3-hydroxymethyl - 7 - (α - methoxy - 3,4 - dichlorophenylacetamido)-decephalosporanic acid lactone which is further purified by successive recrystallization from ether.

In a similar fashion by substituting α-methoxy-4-chlorophenylacetyl chloride, α-methoxyphenylacetyl chloride, α-methoxy-4-trifluoromethylphenylacetyl chloride, α-methoxy-4-nitrophenylacetyl chloride and α-methoxy-4-isopropylphenylacetyl chloride, there are respectively obtained the compounds, 3-hydroxymethyl-7-(α-methoxy-4-chlorophenylacetamido)-decephalosporanic acid lactone, 3 - hydroxymethyl - 7 - (α-methoxyphenylacetamido)-decephalosporanic acid lactone, 3-hydroxymethyl-7-(α-methoxy-4-trifluoromethylphenylacetamido)-decephalosporanic acid lactone, 3-hydroxymethyl-7-(α-methoxy-4-nitrophenylacetamido)-decephalosporanic acid lactone, and 3-hydroxymethyl-7-(α - methoxy-4-isopropylphenylacetamido)-decephalosporanic acid lactone.

*Example 9*

By substituting 4.4 g. of 3-pyridiniummethyl-7-aminodecephalosporanic acid inner salt for 7-aminocephalosporanic acid in the procedure of Example 5, there is obtained upon completion of the steps therein described, the compound 3-pyridiniummethyl-7-(α-methoxy-3,4-dichlorophenylacetamido) - decephalosporanic acid inner salt.

Likewise by employing the α-methoxyphenylacetic acids described in Example 6, there are obtained the compounds 3-pyridiniummethyl-7-(α - methoxy-4-bromophenylacetamido)-decephalosporanic acid inner salt, 3-pyridiniummethyl - 7 - (α - methoxy - 4 - trifluoromethylphenylacetamido)-decephalosporanic acid inner salt, and 3-pyridiniummethyl-7-(α - methoxy-4-methoxyphenylacetamido)-decephalosporanic acid inner salt.

*Example 10*

Phosgene is bubbled through a solution of 1.6 g. of mandelic acid in tetrahydrofuran for 30 minutes. The solution is allowed to stand overnight after which time it is heated at reflux for 10 minutes. The solvent is then removed under reduced pressure and the residue so obtained recrystallized from cold hexane to yield mandelic acid carboxyanhydride.

The cyclic anhydride thus obtained is slowly added to a stirred solution of 2.72 g. (0.01 mole) of 7-aminocephalosporanic acid in 90 ml. of 3% aqueous sodium bicarbonate solution and 50 ml. of acetone with cooling. The mixture is allowed to attain room temperature and the solution stirred for an additional ½ hour. This mixture is next extracted with three portions of 30 ml. of ether and the resulting aqueous solution adjusted to pH 2.5 by the addition of dilute hydrochloric acid while maintaining a temperature of approximately 5° C. Upon attaining the specified pH, the solution is extracted with 25 ml. of butyl acetate, followed by two additional extracts of butyl acetate (10 ml.). The combined butyl acetate extracts are washed with water and 25 ml. of water are added followed by solid potassium bicarbonate until a pH of 8.0 is reached. The aqueous layer is separated, filtered and adjusted to pH 2.0 by the addition of concentrated sulfuric acid at a temperature below 10°. The resultant acidic aqueous mixture is extracted twice with butyl acetate and these extracts are then washed with water and dried over sodium sulfate. To the dried solution is added with vigorous stirring a solution of potassium hydroxide in n-butanol (40 g./l.) until the pH is 8.4. The mixture is allowed to stand with cooling until crystallization occurs and the crystals so formed collected by centrifugation, washed with a small amount of acetone and dried. Upon dissolution in a minimum quantity of 9:1 acetone-water and precipitation by the addition of anhydrous ether, there is formed the compound 7-mandelamidocephalosporanic acid as the patassium salt which is collected by filtration and dried.

This salt when dissolved in water and treated with hydrogen chloride yields the corresponding free acid which may be isolated by extraction with ether and removal of the solvent.

*Example 11*

In a similar fashion, the following substituted mandelic acids are substituted for mandelic acid in equivalent amounts following the procedure of Example 10: 3,4-dichloromandelic acid, 4-chloromandelic acid, 4-iodomandelic acid, 3-fluoromandelic acid, 4-methylmandelic acid, 3,4-dimethoxymandelic acid and 4-trifluoromethyl mandelic acid. There are thus obtained the compounds 7-(3,4-dichloromandelamido)-cephalosporanic acid, 7-(4-chloromandelamido)-cephalosporanic acid, 7 - (4 - iodomandelamido)-cephalosporanic acid, 7-(3-fluoromandelamido)-cephalosporanic acid, 7-(4-methylmandelamido)-cephalosporanic acid, 7 - (3,4 - dimethoxymandelamido)-cephalosporanic acid and 7-(4 - trifluoromethylmandelamido)-cephalosporanic acid.

*Example 12*

By employing 2.16 g. of 3-methyl-7-aminodecephalosporanic acid in place of 7-aminocephalosporanic acid in the procedure described in Example 10 and by completing the procedures therein recited, the compound 3-methyl-7-mandelamidodecephalosporanic acid is obtained.

Likewise by substituting 3-methyl-7-aminodecephalosporanic acid for 7-aminocephalosporanic acid in Example 11 and employing the substituted mandelic acids therein described, the following compounds are prepared: 3 - methyl - 7 - (3,4 - dichloromandelamido) - decephalosporanic acid, 3-methyl-7 - (4-chloromandelamido)-decephalosporanic acid, 3-methyl-7-(4-iodomandelamido)-decephalosporanic acid, 3-methyl - 7 - (3-fluoromandelamido)-decephalosporanic acid, 3-methyl - 7 - (4-methylmandelamido)-decephalosporanic acid, 3-methyl-7-(3,4-dimethoxymandelamido)-decephalosporanic acid, and 3-methyl - 7 - (4 - trifluoromethylmandelamido)-decephalosporanic acid.

*Example 13*

3-pyridiniummethyl-7-aminodecephalosporanic acid inner salt substituted in molar equivalent quantities for 7-aminocephalosporanic acid in the procedure of Example 10. Upon completion of the steps described therein, there is obtained the compound 3-pyridiniummethyl-7-mandelamidodecephalosporanic acid inner salt.

Likewise by employing the substituted mandelic acids recited in Example 10, there are obtained the compounds, 3 - pyridiniummethyl - 7 - (3,4 - dichloromandelamido)-decephalosporanic acid inner salt, 3-pyridiniummethyl-7-(4 - chloromandelamido) - decephalosporanic acid inner salt, 3 - pyridiniummethyl - 7 - (4-iodomandelamido)-decephalosporanic acid inner salt, 3-pyridiniummethyl-7-(3-fluoromandelamido)-decephalosporanic acid inner salt, 3-pyridiniummethyl - 7-(4-methylmandelamido)-decephalosporanic acid inner salt, 3-pyridiniummethyl-7-(3,4-dimethoxymandelamido)-decephalosporanic acid inner salt, and 3 - pyridiniummethyl - 7 - (4-trifluoromethylmandelamido)-decephalosporanic acid inner salt.

*Example 14*

To a stirred solution of 2.12 g. of 3-hydroxymethyl-7-aminodecephalosporanic acid lactone and 90 ml. of 3% aqueous sodium bicarbonate solution in 50 ml. of acetone is slowly added with stirring 1.77 g. of mandelic acid carboxyanhydride. The mixture is allowed to attain room temperature and the solution stirred for an additional ½ hour. The mixture is next extracted with three portions of butyl acetate and the combined butyl acetate extracts washed with water and dried over sodium sulfate. These dried extracts are then concentrated to a residue comprising 3 - hydroxymethyl-7-mandelamido-decephalosporanic acid lactone which is further purified by successive recrystallizations from ether.

In an analogous fashion by employing the carboxy-anhydrides of 3,4-dichloromandelic acid, 4-chloromandelic acid, 3-fluoromandelic acid and 3,4-dimethoxy-mandelic acid in the procedure of this example, there are respectively obtained the compounds 3-hydroxymethyl-7-(3,4-dichloromandelamido)-decephalosporanic acid lactone, 3-hydroxymethyl - 7-(4-chloromandelamido)-decephalosporanic acid lactone, 3-hydroxymethyl-7-(3-fluoromandelamido)-decephalosporanic acid lactone and 3-hydroxymethyl - 7 - (3,4-dimethoxymandelamido)-decephalosporanic acid lactone.

Example 15

A preparation of acetylesterase obtained from the peels of 72 oranges according to the procedure of Jansen et al., Arch. Biochem. 15, 415 (1947), is added to 1 g. of 7-(α-methoxy - 3,4-dichlorophenylacetamido)-cephalosporanic acid dissolved in 15 ml. of water. The pH 1 is adjusted to 6 and maintained at or above this level for 15 hours. At the end of this time, the solution is passed through an IR 4B column (in the acetate form) and eluted with aqueous 0.1 M acetic acid which has been adjusted to pH 5.5 by the addition of pyridine. The solutions collected by development of the column are adjusted to pH 8 by the addition of sodium hydroxide and this alkaline mixture is evaporated in vacuo to yield 3-hydroxymethyl-7 - (α-methoxy-3,4-dichlorophenylacetamido)-decephalosporanic acid as the sodium salt.

To 1 g. of 3-hydroxymethyl-7-(α-methoxy-3,4-dichlorophenylacetamido)-decephalosporanic acid in 10 ml. of collidine are added 15 ml. of propionyl chloride. The mixture is allowed to stand for 10 hours and at the end of this time poured into 25 ml. of ice water. The solid which is thus formed is collected by filtration, recrystallized from dimethylformamide and dried to yield 3-propionyloxymethyl - 7-(α-methoxy-3,4-dichlorophenylacetamido)-decephalosporanic acid. In a similar fashion other lower alkanoyl chlorides such as butanoyl chloride or pentanoyl chloride may be employed in place of propionyl chloride obtaining the corresponding compounds, 3-butanoyloxy-7 - (α-methoxy-3,4-dichlorophenylacetamido)-decephalosporanic acid and 3-pentanoyloxymethyl-7-(α-methoxy-3,4-dichlorophenylacetamido)-decephalosporanic acid.

In an analogous fashion benzoyl chloride is employed in the place of these lower alkanoyl chlorides and it is thus obtained 3 - benzoyloxymethyl-7-(α-methoxy-3,4-dichlorophenylacetamido)-decephalosporanic acid.

By substituting 7-(α-methoxy-4-chlorophenylacetamido)-cephalosporanic acid, 7-mandelamidocephalosporanic acid, and 7-(3,4-dichloromandelamido)-cephalosporanic acid in the procedures of this example, the compounds 3-propionyloxymethyl - 7-(α-methoxy-4-chlorophenylacetamido)-decephalosporanic acid, 3-propionyloxymethyl-7-mandelamidodecephalosporanic acid and 3-propionyloxymethyl - 7-(3,4-dichlorophenylmandelamido)-decephalosporanic acid are respectively obtained.

In a similar manner, by employing benzoyl chloride, the following benzoate esters of the above compounds are prepared: 3 - benzoyloxymethyl - 7-(α-methoxy-4-chlorophenylacetamido)-decephalosporanic acid, 3-benzoyloxy-7-mandelamidodecephalosporanic acid and 3-benzoyloxymethyl - 7-(3,4-dichloromandelamido)-decephalosporanic acid.

Example 16

One gram of 7-(α-methoxy-3,4-dichlorophenylacetamido)-cephalosporanic acid dissolved in excess amyl acetate and to the solution is added 10 g. of N-ethylpiperidine. The solution is stirred for 30 minutes and the crystals formed upon standing are collected by filtration and dried to yield the N-ethylpiperidine salt of 7-(α-methoxy-3,4-dichlorophenylacetamido)-cephalosporanic acid.

In a similar fashion by utilizing 7-mandelamidocephalosporanic acid in this procedure the corresponding N-ethylpiperidine salt is obtained.

Example 17

To a solution of 1 g. of 3-methyl-7-(α-methoxy-3,4-dichlorophenylacetamido)-decephalosporanic acid in excess amyl acetate is added 10 g. of triethylamine. The solution is stirred for 30 minutes and allowed to stand. The solid which forms is collected by filtration and dried to yield the triethylamine salt of 3-methyl-7-(α-methoxy-3,4-dichlorophenylacetamido)-decephalosporanic acid.

Similarly by substituting 3 - methyl - 7 - mandelamido-decephalosporanic acid in the procedure of the present example, there is obtained the triethylamine salt of 3-methyl-7-mandelamidodecephalosporanic acid.

Example 18

One gram of the potassium salt of 7-(α-methoxy-4-chlorophenylacetamido)-cephalosporanic acid is dissolved in water at room temperature and 10 ml. of a 10% aqueous solution of N,N'-dibenzylethylenediamine acetate are added. The mixture is stirred and allowed to stand for one hour and then cooled. The solid which forms is collected by filtration and dried to yield 7-(α-methoxy-4-chlorophenylacetamido)-cephalosporanic acid as the N,N'-dibenzylethylenediamine salt.

By employing an equivalent amount of N,N'-bis-(dehydroabietyl) ethylenediamine acetate in place of N,N'-dibenzylethylenediamine acetate, there is obtained 7-(α-methoxy-4-chlorophenylacetamido)-cephalosporanic acid as the N,N'-bis-(dehydroabietyl)-ethylenediamine salt.

I claim:
1. Compounds having the formula:

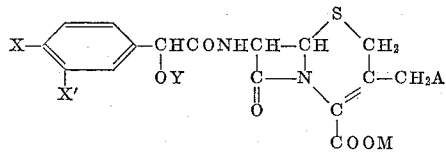

wherein A is a member selected from the group consisting of hydrogen, lower alkanoyloxy, benzoyloxy, hydroxy, pyridinium and when taken together with M a monovalent carbon-oxygen bond; M is a member selected from the group consisting of hydrogen, and the cation form of a member selected from the group consisting of an alkali metal, lower alkyl amine, procaine, N-ethylpiperidine, N, N'-dibenzylethylenediamine, and N,N'-bis-(dehydroabietyl)-ethylenediamine, an anionic charge when A is pyridinium and when taken together with A a monovalent carbon-oxygen bond; Y is a member selected from the group consisting of hydrogen and methyl; and X and X' are members selected from the group consisting of hydrogen, halogen, lower alkyl, lower alkoxy, nitro and trifluoromethyl.

2. The compound having the formula:

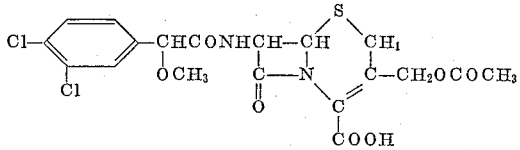

3. The compound having the formula:

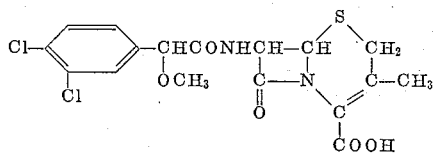

4. The compound having the formula:

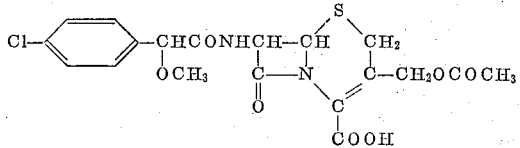

5. The compound having the formula:
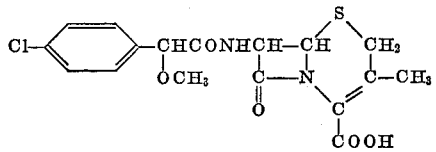
6. The compound having the formula:
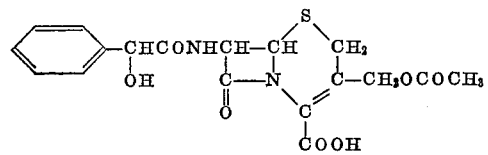
7. The compound having the formula:
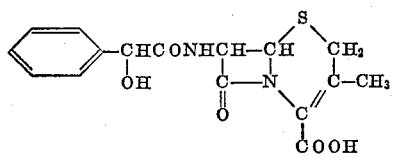
8. The compound having the formula:
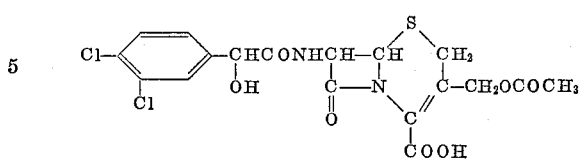
9. The compound having the formula:
References Cited in the file of this patent
Morton: The Chemistry of Heterocyclic Compounds, page VI of the preface.